Sept. 29, 1970 C. F. CHONG 3,531,786
MEMORY DRIVE SYSTEM
Filed Aug. 21, 1967
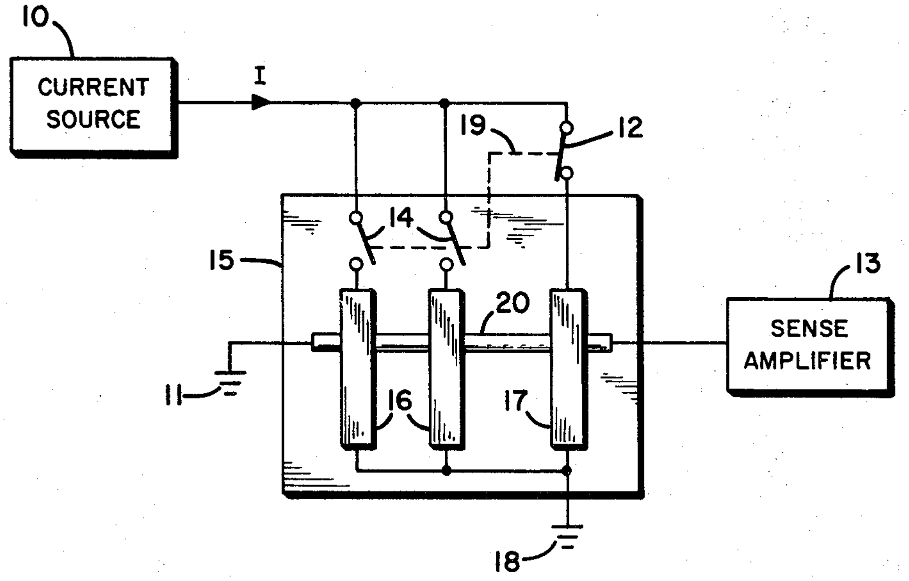
INVENTOR
CARLOS F. CHONG
BY Rene A. Kuypers
ATTORNEY United States Patent Office 3,531,786
Patented Sept. 29, 1970

3,531,786
MEMORY DRIVE SYSTEM

Carlos F. Chong, Norristown, Pa., assignor to Sperry Rand Corporation, New York, N.Y., a corporation of Delaware Filed Aug. 21, 1967, Ser. No. 662,136
Int. Cl. G11c *11/14, 11/50*
U.S. Cl. 340—174 8 Claims

ABSTRACT OF THE DISCLOSURE

This invention relates to a memory drive system which provides improved noise cancellation. This is accomplished by utilizing the dummy word line in conjunction with the regular word line. Quiescently, the dummy word line is always in an energized condition. When a certain word is to be read out of the memory, the regular word line is energized and the dummy word line is simultaneously turned off. Therefore, the noise induced in the memory element adjacent the regular word line is of one polarity, whereas the noise induced in the memory element near the dummy line is of an opposite polarity and accordingly they cancel one another.

In another mode of operation, the memory drive system of this invention can provide a double output signal for a "1" (or a "0") and no signal for a "0" (or a "1"). This is accomplished by storing a "0" (or a "1") under the dummy word line. Therefore, if the memory element is one that gives a positive output for a "1" and a negative output for a "0," then the output detected by an associated sense amplifier will be doubled for a "1" (or a "0") and nothing for a "0" (or a "1").

This invention relates in general to a memory drive system and in particular relates to a memory drive system for use with a plated wire storage element.

In known prior art plated wire drive systems it has been the practice to quiescently provide a current from a current source which flows through a current sink to ground. When the current which flows through the current sink to ground is needed for selection purposes in the memory plane, the current flowing through the current sink is transferred to the word line by switching means. This technique is conventionally followed since it enables much faster switching to take place than if the current source were to supply the selected word line directly. However, this quiescent current flow serves no useful purpose other than that above mentioned. The instant invention provides for a memory drive arrangement wherein the current quiescently flowing through the current sink to ground is utilized to energize a dummy word line in the main memory bank. This arrangement enables improved noise cancellation to be obtained. By a further slight modification of the invention, improved discrimination can be obtained between a "0" or a "1" since twice the output may be obtained for a "1" (or a "0") whereas nothing will be provided for a "0" (or a "1").

In summary, this invention relates to a new and improved memory drive system arrangement whereby noise cancellation of a memory system is improved by simultaneously energizing the required drive line of a memory plane and de-energizing a dummy line which quiescently conducts current. Since both the dummy line and the regular word line are juxtaposed to a plated wire memory element, the noise induced in the plated wire is the same but of opposite polarities, so that they effectively cancel. Accordingly, an improved noise cancellation technique is obtained for the plated wire memory element.

Furthermore, by storing a data bit under the dummy strap, twice the output can be obtained for a "1" (or a "0") and substantially no signal can be obtained for a "0" (or a "1").

It is therefore an object of this invention to provide a new and improved memory drive system.

It is still a further object of this invention to provide a new and improved memory drive system for use with a plated wire memory element.

It is yet another object of this invention to provide a new and improved noise cancellation technique.

It is another object of this invention to provide a new and improved signal to noise ratio technique for a memory device.

The accompanying drawing depicts the memory drive system of the instant invention.

Referring now to the drawing in greater detail, there is depicted a plated wire memory element 20 one end which is connected to a sense amplifier 13 and the other end is connected to a terminating means 11. The plated wire 20 makes a complete circuit with the sense amplifier 13 by means of the terminating means 11 and with the sense amplifier which is grounded. The plated wire 20 comprises, by way of example, a 5 mil diameter beryllium copper substrate upon which is plated a thin magnetic coating of ferromagnetic material. The ferromagnetic coating is approximately 10,000 angstroms thick and has a uniaxial anisotropy which is circumferential. A plurality of plated wires such as 20 are positioned parallel to one another on, for example, 15 mil centers. Only one wire 20 is depicted for ease of understanding.

Oriented substantially perpendicular to the plated wire 20 are a plurality of conductive word lines 16. Ends of the word lines are common-connected to a ground terminal 18. Each word line is further connected to a respective switch 14. The other ends of the switches 14 are common-connected to a current source 10. The combination of the word lines with the plated wire memory elements comprise what is normally called a memory plane 15. Accordingly, when it is required to read out the information along a particular word line, one of the switches 14 is closed. This enables current to flow in the selected word line so that the information stored along the word line may be read out.

Also positioned within the memory plane 15 is the dummy line 17. The dummy line is also connected to the current source 10 by means of the sink switch 12. In one mode of operation of the instant invention, no information is stored along the plated wide 20 directly under the dummy line 17 (i.e., the dummy bit). This may be accomplished by several techniques known in the art. For example, the dummy bit may be de-magnetized or magnetic material may be removed thereat or even "scratched" so that the circumferential magnetic field is no longer present. By these various techniques, the dummy bit cannot store information.

In operation, current from the current source 10 quiescently flows through the sink switch 12 and through the dummy line 17 to ground 18. The current source 10 is also grounded so that the circuit is thereby completed. Current flows through the dummy line 17 via the sink switch 12 so that current may be quickly switched to the selected word line 16. This enables faster operation of the memory to take place than if the current to the required word line 16 was obtained by energizing the current source 10. As was previously mentioned, there is no output from the plated wire memory element 20 by this operation since there is no information stored at the dummy bit.

When information is to be read out of the memory plane 15, the required word line 16 is energized by closing its associated switch 14. Simultaneously with the closing of the switch 14, the sink switch 12 to the dummy line 17 is opened. As is well understood, when the current flows in the selected word line 16 the current therein causes the magnetization vectors oriented circumferentially to be rotated to some angle less than 90° therefrom. This induces a signal in the plated wire 20 which is detected by the sense amplifier 13. Depending upon whether the magnetization vectors are oriented circumferentially in a clockwise or counter-clockwise direction, the induced signal which is detected by the sense amplifier 13 is either positive or negative indicating that a "1" or a "0" is stored thereat.

It should be further noted however that because of the close coupling between the word lines 16 as well as the dummy line 17 to the plated wire 20 a noise signal is induced therein when these lines are energized or deenergized. This noise signal accompanies the required information signal and must be reduced to a minimum for proper operation of the memory. The noise is reduced to a minimum and is virtually zero in view of the memory arrangement provided. This is accomplished in the following manner.

Thus it will be recalled that the current in the dummy line 17 is decreasing while the current in the required word line 16 is increasing. In other words, there is an increasing change of flux $$\left(\frac{d\phi}{dt}\right)$$

in the world line 16 due to the closing of the switch 14 while there is a decreasing change of flux $$\left(-\frac{d\phi}{dt}\right)$$

in the dummy line 17 due to the opening of the switch 12. In a like manner, capacitive noises are also cancelled out. Accordingly, the voltage of noises induced in the plated wire 20 caused by these two changing currents are in opposite directions so that they effectively cancel. Since the noises induced on plated wire 20 cancels one another, the induced binary "1" or "0" signal caused by the rotation of the magnetization vectors is transferred to the sense amplifier 13 virtually free of noise. This is of great importance in a digital computer operation since errors can be easily incurred in the system by these extraneous noise signals. The reason why the two induced signals cancel may be explained by Lenz's law. Thus, a signal is induced in plated wire 20 to oppose the reduction of current in the dummy line 17 whereas a signal is induced in plated wire 20 to oppose the increase of current in the regular word line 16. These two induced signals cancel one another.

In another mode of operation, the instant invention may be arranged to provide improved discrimination between a binary "0" and a binary "1." This is accomplished in the following manner. The memory drive system is exactly as shown in the accompanying drawing, except with the following modification. In place of the arrangement whereby no information is stored at the dummy bit as in the first mode of operation, a binary "1" or "0" is stored thereat. Thus, let us assume that a binary "0" is stored at the bit position along plated wire 20 under the dummy line 17. By way of example, this will represent magnetization vectors which are oriented counter-clockwise when viewed from the rightward end and along its length (i.e., from right to left). In like manner, let it be assumed that a "1" is stored along the plated wire 20 under the left-most word strap 16. For this particular binary number the information or the magnetization vectors will be oriented in a clockwise manner around the circumference of the wire. Accordingly, when current is caused to flow in a downward direction through the word strap 16, a voltage will be induced in wire 20 which causes a positive current to flow in a leftward direction towards ground terminal 11 as a result of Lenz's law. Since the current through the dummy word line 17 is turned off at the same time that the current in the word strap 16 is turned on, it follows, that the magnetization vectors will rotate back to the "easy" direction. As a result of Lenz's law, the same polarity signal which causes a positive current also will be induced in wire 20 which flows in a leftward direction. In other words, since there is an increase in flux in the counter-clockwise direction when the current no longer flows in dummy line 17, a signal will be induced which will oppose this increase. This current is termed positive and flows leftwardly. Thus, it can be readily seen that for a binary "1" to be stored at a certain location along the plated wire 20 a voltage is induced in the sense amplifier 13 which is double that of the voltage induced therein without the dummy wire.

In like manner, if a binary "0" is stored along the plated wire 20 along the drive line 16, and assuming that the information along the dummy wire 20 remains a "0," it can also be readily shown that the two induced signals will cancel one another and hence no signal will be received by the sense ampifier 13 for a binary "0." As a result of the mode of operation, improved discrimination is obtained between a binary "0" and a binary "1."

Although the description of this invention has been made with respect to a read cycle, it should be readily understood the principles and operation described herein also apply to a memory write cycle.

The embodiments of the invention in which an exclusive property or privilege is claimed are defined as follows:

1. A memory drive system comprising:

(a) a plurality of memory drive lines;

(b) a plurality of switch means, each different one of said switch means being associated with a different one of said plurality of memory drive lines,
said switch means being in the normally open position;

(c) a dummy drive line;

(d) a switch associated with said dummy drive line, said switch being normally in the closed position;

(e) a plurality of memory elements to store binary information, a different memory element being coupled to a different memory drive line;

(f) a line coupling all of said memory elements as well as being juxtaposed to said dummy line;

(g) a current source connected to each to said plurality of drive and said dummy line via said respective switches;
said current source causing current to quiescently flow through said dummy drive line and through said normally closed switch;

(h) means for closing one of said plurality of normally open switches associated in order to select a memory word line and for simultaneously opening said switch associated with said dummy line, whereby the noise induced in said line cancels.

2. The memory drive system in accordance with claim 1 wherein said plurality of memory elements comprises a wire substrate with a ferromagnetic coating having the property of uniaxial anisotropy.

3. The memory drive system in accordance with claim 2 wherein said wire substrate is juxtaposed to said dummy line.

4. The memory drive system in accordance with claim 2 wherein said wire substrate comprises a 5 mil diameter beryllium-copper wire.

5. The memory drive system in accordance with claim 2 wherein said ferromagnetic coating is deposited with a thickness of approximately 10,000 angstroms.

6. The memory drive system in accordance with claim 2 wherein said ferromagnetic coating is approximately 80% nickel and 20% iron.

7. The memory drive system in accordance with claim 1 wherein said line is connected to a sense amplifier.

8. The memory drive system in accordance with claim 7 wherein a memory element is juxtaposed to said dummy drive line said information stored by said dummy line being unalterable whereby the output detected by sense amplifier is substantially zero or twice the output of a single memory element.

References Cited

UNITED STATES PATENTS

| | | | |
|---|---|---|---|
| 3,311,901 | 3/1967 | Fedde et al. | 340—174 |
| 3,289,184 | 11/1966 | Brown | 340—174 |

JAMES W. MOFFITT, Primary Examiner